Sept. 25, 1962 R. D. RICKETTS 3,055,987

TRANSDUCER ASSEMBLY

Filed Nov. 25, 1959 2 Sheets-Sheet 1

INVENTOR:
Russell D. Ricketts

By Richard K. Ehrlich
Attorney

INVENTOR:
Russell D. Ricketts

By Richard K. Ehrlich
Attorney 3,055,987

TRANSDUCER ASSEMBLY

Russell D. Ricketts, Woodland Hills, Calif., assignor to Litton Industries of California, Beverly Hills, Calif.

Filed Nov. 25, 1959, Ser. No. 855,305
5 Claims. (Cl. 179—100.2)

This invention relates to a transducer assembly and more particularly to a transducer assembly including a transducer head for use with a memory drum, the transducer head being capable of compensating for drum eccentricity and run-out by undergoing pure radial movement.

In numerous electronic systems it is frequently necessary to store or remember intelligence information presented as a continuously variable electrical signal in time, and to play back the information at a subsequent point in time for comparison with other signals or for other operational purposes. In the fields of high speed digital computation, pulse code communication, and information correlation in particular, the foregoing storage requirements are further complicated by the fact that the stored information must be periodically presented at cyclically repetitive points in time, and with relatively short access times, the term access time being utilized in the art to denote the maximum interval which must be waited before the desired information is again presented at the output of the memory unit.

As a result of the foregoing factors, it has become common practice to employ as a memory unit a rotatable drum whose periphery is magnetizable, and a plurality of magnetic writing and reading transducers positioned adjacent the periphery of the drum for sequentially writing signals on the drum or for reading signals from the drum; the terms writing and reading respectively denote the conversion of applied electrical signals to magnetized cells on the drum, and the generation of electrical output signals corresponding to the magnetization of the cells passing beneath a transducer. For purposes of simplicity, the term recording will hereinafter be considered generic to both reading and writing operations, since in practice a transducer may be utilized to either read or write, as desired, and the functional use implies no structural difference.

In its most common form, a magnetic drum memory unit employs a drum whose periphery is coated with either iron oxide or nickel-cobalt, and one or more transducer assemblies which are spaced from the drum periphery by several thousandths of an inch. The transducers are also usually positioned axially, with respect to the drum, over one or more parallel tracks or channels on the drum, where the term track or channel denotes a reference circle on the drum periphery which continuously passes beneath the transducers associated with that particular track. In the prior art several different forms of magnetic transducers have been found acceptable for use with magnetic drums, the most common form being a horseshoe-shaped core of magnetic material which carries an electrical coil or winding remote from the core gap, the gap in the core being positioned axially and adjacent the associated drum track. In writing signals on the drum, therefore, energization of the transducer winding creates a magnetic field at least part of which bridges the core gap by way of the adjacent drum periphery. Conversely, in reading signals from the drum, a portion of the flux produced by the magnetized cells on the drum channel bridges through the transducer core and thereby generates an electrical output signal in the associated transducer winding.

Although magnetic drum memory systems of the prior art perform satisfactorily in most applications, they still have a number of serious limitations. Firstly, in prior art non-contact transducer heads, the positioning of the transducer heads adjacent the drum is difficult since the transducer heads must be positioned over the desired tract on the drum and must be radially spaced from the drum periphery within one- or two-thousandths of an inch. A second disadvantage of prior art non-contact transducer heads is that the magnetic drum must be precision ground so that eccentricity is limited to a few ten-thousandths of an inch, the reasons for this requirement being that eccentricity causes the drum-to-head spacing to vary as the drum is rotated, which varies the recording resolution and magnetization, and amplitude modulates the recorded and playback signal. Still another disadvantage of non-contact transducer head recording is the fact that the maximum resolution in terms of cell density per unit length of drum, and for a given signal-to-noise ratio, is relatively low because the magnetic flux which bridges the core gap is effective over a length of the drum surface which is considerably larger than the core gap itself. This disadvantage is inherent in a non-contact head recording system since the head is spaced from the surface of the drum.

In order to overcome the foregoing described limitations of non-contact transducer heads, numerous types of contact heads have been developed. However, virtually all prior art contact heads suffer from the inherent limitation that as the head changes its radial position to accommodate for drum eccentricity or run-out, the alignment of the head with respect to the surface of the drum varies since the head does not experience pure radial movement but experiences rotation about an axis displaced a distance from the transducer head which tends to approximate pure radial movement. It is clear, of course, that when the alignment of the head varies so that it is not orthogonal to the surface of the drum, only a portion of the bottom side of the head is in contact with the drum surface and, further, the head gap is positioned off the drum. In view of the foregoing, it is clear that not only will the operation of the head be effected due to the displacement of the head gap from the drum surface, but, in addition the life expectancy of the drum will be substantially reduced since the pressure exerted against the surface of the drum by the weight of the head and the spring force urging the head against the drum is greatly increased because the surface area of the head in contact with the drum is reduced.

In the prior art, one type of contact head that has minimized the foregoing limitations of contact head recording is disclosed in copending U.S. patent application, Serial No. 604,947 for "Magnetic Drum Memory System," filed on August 20, 1956, by D. L. Curtis and R. B. Larsen. Briefly, Curtis and Larsen disclose a contact head which comprises a miniaturized core having a gap therein. The head is held in continuous contact with the surface of an associated drum by at least one conductive cantilever spring which also electrically connects the head.

The Curtis and Larsen head has proven itself to be one of the most useful recording heads known in the prior art. However, it too is somewhat limited in accuracy by the fact that the head gap is to some extent lifted off the surface of the drum when the head rotates with the cantilever spring to compensate for drum run-out and eccentricity.

The present invention, on the other hand, overcomes the foregoing described and other limitations of the prior art transducer assemblies by providing a transducer assembly having a transducer head which compensates for drum eccentricity and run-out by permitting the transducer head to experience only pure radial movement whereby the head gap of the transducer always remains in contact with the drum surface.

In accordance with the concepts of the present invention, a transducer head is mounted adjacent a memory drum by means of a parallelogram-shaped structure.

More particularly, in accordance with one concept of the invention, the transducer head is mounted by means of a parallelogram-shaped structure whose plane is orthogonal to the rotational axis of the drum. The parallelogram-shaped structure having a pair of first and second opposite sides, the first side affixed to the transducer head and the second side affixed in position with respect to the drum so that it is orthogonal to the rotational axis of the drum. Thus, since the first side is always maintained parallel to its opposite side by the overall parallelogram configuration, it is clear that the transducer head is capable of compensating for drum eccentricity with pure radial movement.

According to one embodiment of the present invention, a transducer head is mechanically coupled to a transducer mounting bracket by means of a parallelogram-shaped structure and is electrically connected to a step-down transformer having a rigid U-shaped single turn secondary winding and a ferrite core with an aperture therein, the two legs of the U-shaped secondary winding being connected to the transducer head and passing through the aperture in the ferrite core without contacting the core whereby the radial movement of the transducer head is not restricted by the electrical connection.

Therefore, it is an object of the present invention to provide a transducer assembly having a transducer head capable of compensating for drum eccentricity and run-out without affecting the operation of the transducer head.

It is another object of the present invention to provide a transducer head capable of compensating for drum eccentricity and run-out by pure radial movement.

It is a further object of the present invention to mount a transducer head on a transducer mounting bracket by means of a parallelogram-shaped structure.

It is still another object of the present invention to provide a transducer head for use with a memory drum capable of maintaining its gap in constant contact with the surface of the drum.

It is still a further object of the present invention to provide a transducer head mechanically coupled to a transducer mounting bracket by a parallelogram-shaped structure and electrically connected to a transformer mounted on the transducer mounting bracket by a rigid U-shaped secondary winding having two legs whose ends are connected to the transducer head, the secondary winding passing through an aperture in the ferrite core of the transformer without contacting the core.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figure 4A:
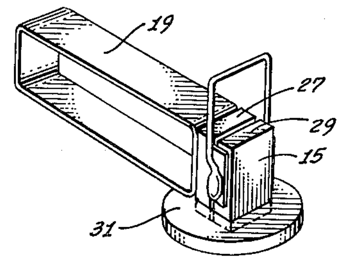
Figure 4B:
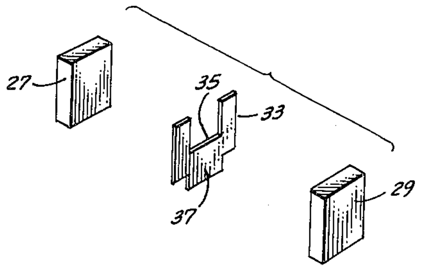
Figure 4C:
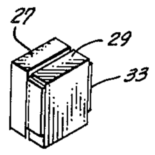

FIGURES 4*a* through 4*c* are views of the structure and manner of fabrication of the transducer head of the present invention.

Figure 5A:
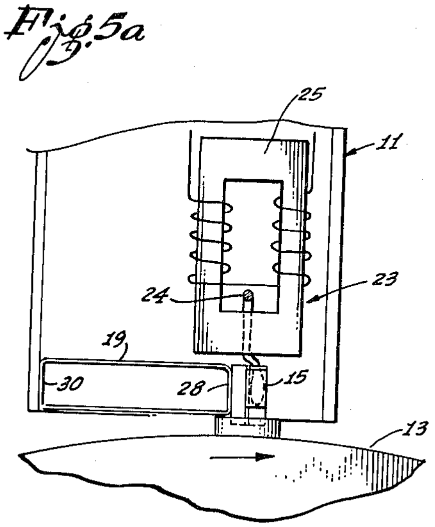
Figure 5B:
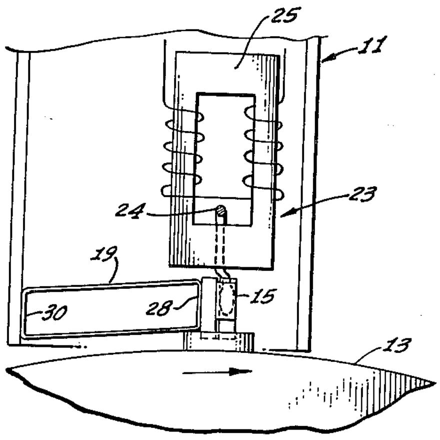

FIGURES 5*a* through 5*b* are interior side views of the transducer assembly of the invention wherein the operation of the parallelogram-shaped structure is depicted.

Figures 1, 2, 3:
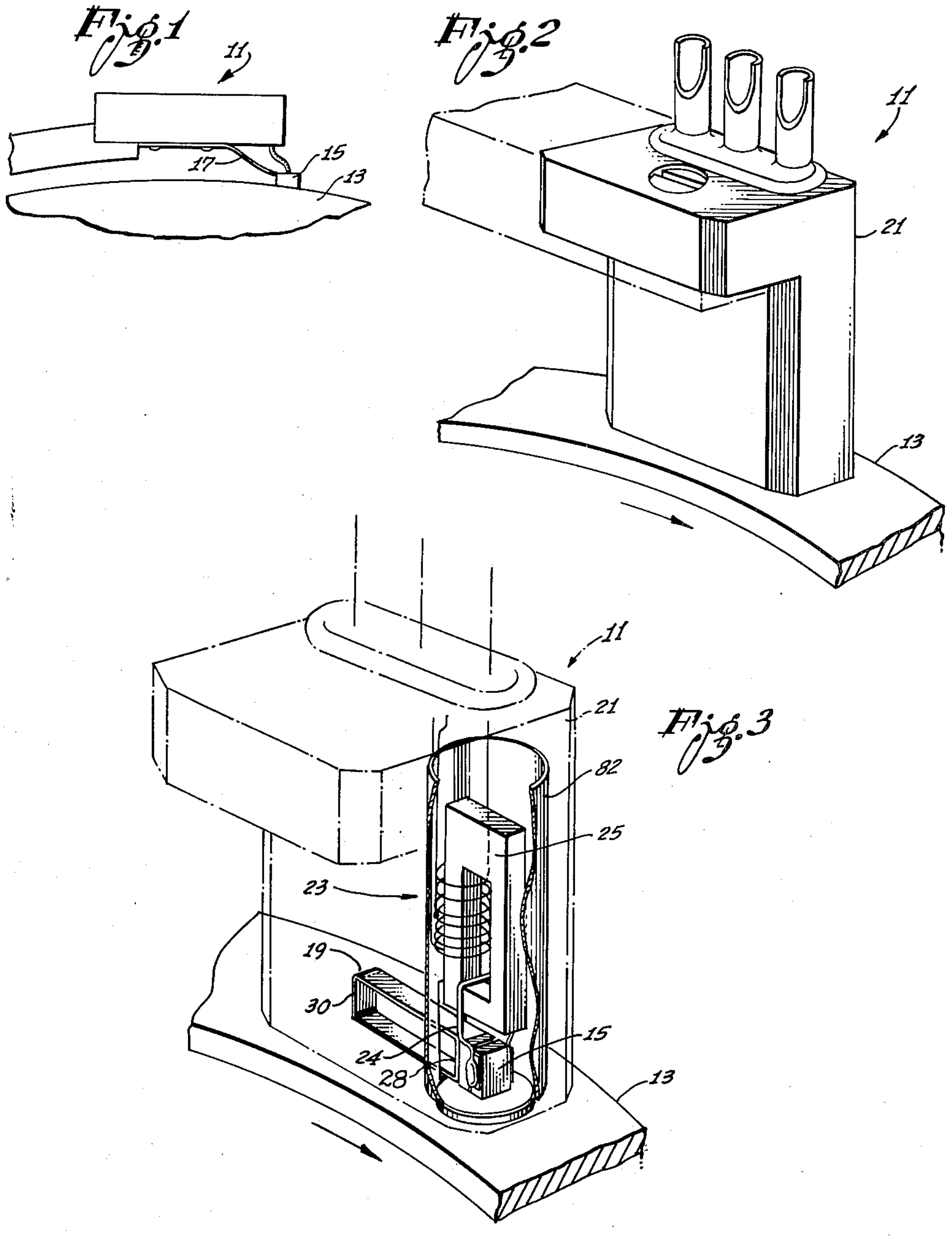
FIGURE 1 is a side elevational view of a transducer assembly of the prior art.
FIGURE 2 is a three-dimensional view of a transducer assembly of the present invention.
FIGURE 3 is an interior view of the transducer assembly of the invention.

Referring now to the drawings wherein like or corresponding parts are designated by the same reference character throughout the several views, there is shown in FIGURE 1 a transducer head assembly 11, typical of prior art transducer head assemblies, positioned adjacent a rotatable magnetic memory drum 13 and which is operable to read or record information on or off of the drum. It should be noted that for purposes of simplicity the term recording will be hereinafter considered generic to both reading and writing.

As shown in FIGURE 1, a transducer head 15 positioned in contact with the surface of drum 13 is affixed to the rest of the transducer assembly by means of a cantilever 17. As is apparent, transducer head 15 is operable to rotate about the point of junction of cantilever 17 and the transducer assembly in response to drum run-out and eccentricity whereby the transducer head not only experiences radial movement to compensate for the eccentricity and run-out but experiences circumferential movement as well as having the orientation of the bottom side of the transducer changed so that it no longer completely contacts the surface of the drum. It is clear, of course, that the foregoing described difficulties limit the packing density and accuracy of the prior art transducer head disclosed in FIGURE 1.

Referring now to the present invention, there is shown in FIGURE 2 a three-dimensional view of a transducer head assembly 11, mechanized in accordance with the concepts of the invention, which is mounted by means of a mounting bracket and housing 21 on a transducer mounting station adjacent a rotatable magnetic memory drum 13. In accordance with the present invention transducer assembly 11 is mechanized in such a manner that it compensates for drum run-out and eccentricity by substantially pure radial movement whereby the bottom side of the transducer head remains in complete contact with the drum surface and hence continuous contact of head gap with the drum is insured. Further, the circumferential positioning of the head remains substantially unchanged.

Referring more specifically to the basic structuer of the transducer assembly, attention is directed to FIGURE 3 wherein there is shown a view of the interior of the transducer assembly, assembly housing and mounting bracket 21 being substantially removed. As shown in FIGURE 3, a transducer head 15 is supported by a cantilever parallelogram-shaped structure 19 having a pair of opposite sides 28 and 30 and a pair of opposite sides 32 and 34. As is shown in FIGURE 3, side 28 is affixed to the transducer assembly and side 30 is affixed to mounting bracket 21, a portion of which is shown in FIGURE 3. Further, it is clear that transducer head 15 is electrically connected to external circuitry as, for example, a recording amplifier, by means of a step-down transformer 23. As is shown in FIGURE 3, step-down transformer 23 includes a ferrite core 25 which has an aperture therein and a center-taped primary winding wound around one end of the ferrite core. In addition, transformer 23 includes a U-shaped secondary winding 24 which passes through the aperture in the ferrite core without contacting the core, the ends of the two legs of the U-shaped secondary winding being eletcrically connected to transducer head 15. It should be noted that this type of transformer is particularly suited for use in a transducer which is to be used with highly eccentric drums since the transformer does not restrict the freedom of movement of the transducer head.

Referring now to the specific structure of transducer head 15, attention is directed to FIGURES 4*a* through 4*c* wherein the structure of the head as well as one suitable method of fabrication thereof is depicted. As shown in FIGURE 4*a*, transducer head 15 has a single turn conductor partly positioned between a pair of rectangular ferrite blocks 27 and 29, and folded about block 29, and a phenolic foot 31. In connection with the detailed structure of the transducer head, attention is directed to FIGURE 4*b* wherein there is shown a blank 33 of conductive material which is utilizable as the single turn conductor for electrically energizing the contact head and for spacing a recording gap, the blank preferably being composed of a good conductor, such as solid silver, and being of the order of .5 mil in thickness. As indicated in the drawings, the top of the blank is reduced in a central region as shown at 35, while the lower edge of blank 33 preferably includes a tab 37 in the central region.

Continuing with the discussion of the fabrication of the transducer head, blank 33 is first placed against one side of rectangular ferrite block 29 and is then wrapped around the block, as shown in FIGURE 4*c*, so that the reduced central region of the blank faces on the front surface of block 29. Rectangular ferrite block 27 is pressed firmly against the front face of ferrite block 29, as shown in FIGURE 4*c*. Thus, it will be seen that the ferrite blocks 27 and 29 form a U-shaped ferromagnetic core with the central region of conductor 33 filing the gap therein. A small dab of a suitable cement, such as resin, may be placed on the top of the combination to hold the ferrite blocks and silver blank 33 in their assembled position.

Referring now to the final step in the fabrication of the head and to the method of affixing the parallelogram-shaped structure 19 to the head, the ends of the assembled ferrite blocks containing tab 37 are placed in a suitable jig or fixture which holds foot 31, U-shaped secondary winding 24, and parallelogram-shaped structure 19 in alignment with the blocks. The ends of the secondary windings are soldered to the folded ends of the silver gap material after the winding is passed through the aperture in core 25. The ferrite blocks and adjacent parts are then secured in place by encasing them with a suitable resin.

When the resin hardens, the completed transducer head and parallelogram shaped structure are removed from this first jig and placed in a second jig together with housing 21 whereby the head gap is correctly aligned with the rear of the housing so that when the housing is mounted adjacent the drum the head gap is orthogonal to the rotational axis of the drum. As a final step in the fabrication process of transducer head 15, the head should be placed in a third jig or fixture, and an abrasive material should be employed to grind or polish the bottom side of the transducer head to insure that the recording gap between the two assembled ferrite blocks is flush with the bottom side of the transducer head. This final step insures that there will be a proper engagement between transducer head 15 and the magnetizable surface of the drum when the transducer head is subsequently mounted in contact therewith. It should be noted that the silver conductor between the ferrite cores serves to accurately space the blocks from each other as well as to provide a path for electrically energizing the recording head.

The completely transducer assembly 15 is positioned adjacent the surface of drum 13 by mounting the assembly on a mounting station as shown in FIGURE 2. There is shown in FIGURE 5*a* the specific positioning of the interior components of the transducer assembly with respect to the drum. As indicated in FIGURE 5*a*, the transducer mounting bracket and housing 21 is mounted in such a manner that side 30 of parallelogram-shaped spring 19 is radially oriented with respect to the drum. It should be noted that as used herein the term "radially oriented" means that side 30 is substantially parallel to and coincident with a line drawn from the rotational axis of the drum to the gap line, the gap line being defined by the locus of the contact between the transducer gap and the surface of the drum. As is further shown in FIGURE 5*a*, transducer assembly 15 is mounted adjacent drum 13 in such a manner that parallelogram-shaped structure or spring 19 is stressed when in contact with a portion of the drum having a substantially normal or average radius such that the parallelogram-shaped structure 19 has a rectangular configuration.

Referring now to the manner of operation of the parallelogram-shaped cantilever structure and assuming that the transducer assembly is mounted adjacent the drum as shown in FIGURE 5*a*, it is clear that when the bottom side of the transducer head is in contact with portions of the surface of the drum having the average or normal radius the parallelogram-shaped structure will be substantially rectangular as indicated in the figure. However, assume that as the drum rotates the transducer head comes in contact with a portion of the surface of the drum which due to run-out or eccentricity has a radius which is greater than the average or normal radius. It is clear that in this case the transducer head must move radially out in order to compensate for the increased radius of the drum. Since parallelogram-shaped structure 19 maintains its opposite sides parallel even under such a stress, the parallelogram-shaped structure will be flexed from its rectangular shape as shown in FIGURE 5*b*, when the transducer head moves radially out. Remembering now that side 30 is radially oriented and that side 28 remains parallel with side 30 it is clear since side 28 is affixed to the surface of one of the ferrite blocks that the longitudinal axis of transducer 15 will remain radially oriented even though it undergoes movement to compensate for drum run-out and eccentricity.

It is clear from the foregoing description that the parallelogram-shaped structure operates in substantially the same manner to maintain the transducer head radially aligned when the transducer moves in toward the center of the drum, as when it is in contact with protions of the surface of the drum having a radius less than the average or normal radius. Referring again to FIGURE 5*b*, it is evident that transducer head 15 does undergo slight circumferential movement as the transducer head moves radially. However, this circumferential movement is negligible and, in any case, is substantially reduced from that experienced by conventional cantilever heads.

It should be noted that parallelogram-shaped structure 19 can be fabricated from a variety of materials since the ability of the structure to maintain its opposite sides parallel is dependent upon its geometrical configuration to a large extent. However, various types of spring metals have been found to be particularly suitable for use in the fabrication of the structure. It should be noted that in order to minimize the inaccuracies due to temperature variations, the parallelogram-shaped structure should be fabricated from a material whose coefficient of expansion is as near as possible to the coefficient of expansion of the material from which transducer mounting bracket 21 is fabricated. For example, if transducer mounting bracket is fabricated from aluminum, beryllium-copper spring material has been found particularly suitable for fabrication of the parallelogram-shaped structure. It should further be noted that while parallelogram structure 19 should be fabricated from a single piece of material, it can be fabricated from several pieces of the same type material or for that matter, several pieces of different types of material as long as they possess substantially the same physical properties.

Continuing further with the discussion of the transducer head assembly, as is indicated in FIGURE 3, the two legs of the rigid secondary winding U-shaped conductor are connected to the two ends of blank 33 by means of a dab of solder. It is clear that the U-shaped conductor can be fabricated from any rigid conductive material, such as copper. As was hereinbefore stated, conductor 24 passes through the aperture in core 25 whereby the transducer head is inductively coupled to the secondary winding of the transformer. As is apparent from FIGURE 3, the aperture in the transformer is sufficiently large so that conductor 24 will never touch the transformer core even though the conductor moves within the aperture as the transducer head experiences radial movement. Hence, the radial movement of the head is not impaired by friction between the conductor and the transformer core.

A cylindrical shield 82, preferably fabricated from a thin silver sheet, is positioned around step-down transformer 23 in order to isolate the transformer from the surrounding area. In FIGURE 3 the cylindrical shield 82 is broken in order that the specific structure of transformer 23 may be depicted.

Turning now to a discussion of the overall operation of the transducer head assembly of the invention, transducer mounting bracket 21 is positioned on the transducer mounting station adjacent the memory drum so that the gap of the transducer head is in contact with the surface of the drum and so that the longitudinal axis of the transducer head is radially oriented with respect to the drum. As has been hereinbefore noted, as the drum rotates different portions of the drum's surface come in contact with the transducer head gap. However, due to eccentricity and drum run-out, the distance from the rotational axis of the drum of the various portions of the drum's surface which come in contact with the transducer gap varies. The transducer head of the present invention is capable of compensating for such variation by undergoing pure radial movement. This pure radial movement is due to the operation of the parallelogram-shaped cantilever structure of the invention. Hence, the transducer gap will be maintained in contact with the magnetizable surface of the drum so that the sensitivity and accuracy of the transducer head remains unaffected by the drum eccentricity and run-out.

Investigating the effect of the transducer gap being in constant contact with the magnetizable surface of the drum more closely, it is clear that almost all of the magnetic flux field generated by the energizing current which passes from one ferrite block to the other ferrite block is concentrated in the region immediately adjacent the gap of the head, since this is by far the most reluctant path presented the magneto-motive force generated by the transducer head. Therefore, the resolution provided by the head of the invention is exceptionally high compared to the resolution obtained by prior art cantilevered contact heads since in the prior art cantilever heads the bottom side of the transducer head is rotated by drum eccentricity whereby the transducer gap is displaced from the surface of the drum.

It should be herein specifically mentioned that although the transducer assembly shown herein has included a transformer for energizing the recording head, it is obvious that a transducer head could be directly electrically connected to a pair of terminals on the transducer mounting bracket from which the head could be energized by direct current signals. The need for a transformer would be eliminated although the output impedance of the source energizing the recording head would have to be relatively low to match the low impedance of the single-turn conductor which creates the magnetic field in the head.

It should further be expressly understood herein that the basic concepts presented herein can be modified in different structures from the specific structures shown without departing from the spirit of scope of the invention. For example, the transducer assembly of the present invention may be modified so that the transducer head 15 is electrically actuated by means of the two cantilever sides 32 and 34 of parallelogram-shaped structure 19. It is clear, of course, that in order to accomplish this modification the parallelogram-shaped structure must be modified so that a portion of side 28 can be fabricated from an insulating material. Further, it is equally clear that the parallelogram-shaped structure 19 can be fabricated without sides 28 and 30, the wall of the rear side of transducer mounting bracket 21 being substituted for side 30 and the side of the ferrite block being substituted for side 28. Accordingly, it is to be understood that the spirit or scope of the invention is to be limited only by the scope of the appended claims.

What is claimed as new is:

1. In a transducer assembly, the combination comprising: a transducer mounting bracket; a transducer head having a bottom side thereon with a gap line therein; a pair of parallel cantilever arms having first and second ends, each of said first ends secured to said transducer mounting bracket and each of said second ends secured to said transducer head, said arms connecting said first and second ends being orientated substantially orthogonal to said bottom side at said gap line; and a transformer coupled to said transducer mounting bracket, said transformer including a ferrite core having an aperture therein and a rigid U-shaped secondary conductor movable relative to said ferrite core, said U-shaped conductor passing through said aperture and the legs of said U-shaped conductor being coupled to said transducer head, said aperture being of sufficient size to permit movement of said U-shaped conductor.

2. The combination defined in claim 1 wherein said transducer head includes a single-turn contact head including a high permeability U-shaped ferromagnetic core, the legs of said core being spaced apart a predetermined distance by said gap and a ribbon-like conductor substantially filling said gap, said ribbon-like electrical conductor having first and second ends.

3. The combination defined in claim 2 which includes coupling means for coupling one of the legs of said secondary conductor to said first end of said ribbon-like electrical conductor and the other leg of said secondary conductor to said second end of said ribbon-like electrical conductor, whereby said transducer head is electrically actuated without the radial movement of said transducer head being constrained.

4. In a transducer assembly for use with a circular memory member having a magnetizable surface thereon, the assembly compensating for eccentric movement of the member perpendicular to the magnetizable surface, the combination comprising: a transducer head having first and second electrical terminals and a bottom side with a gap line thereon; a transducer mounting bracket mounted adjacent the circular member; a parallelogram-shaped structure having a first side mounted on said transducer mounting bracket such that said parallelogram-shaped structure is positioned substantially orthogonal to the magnetizable surface when the transducer mounting bracket is positioned adjacent the circular member, the side opposite said first side being affixed to said transducer head so that said gap line is substantially perpendicular to said first side and said gap line is in contact with the surface of the member; and a transformer having a primary and a secondary winding and a ferrite core with an aperture therein, said secondary winding being coupled to said first and second electrical terminals and positioned through said aperture without touching said ferrite core said aperture being of sufficient size to permit movement of said secondary winding relative to said ferrite core.

5. A transducer assembly for use with a memory drum, said assembly comprising: a transducer head including a U-shaped ferromagnetic core having a bottom side, the legs of said core being spaced apart a predetermined distance by a gap, said gap intersecting said bottom side along a gap line, and a ribbon-like electrical conductor having first and second ends substantially filling said gap; a transducer mounting bracket positioned adjacent the drum; first and second pairs of parallel opposite sides intercoupled to form a parallelogram-shaped structure, one of said first pair of sides being mounted to said transducer mounting bracket and being radially oriented, the other of said first pair of sides being affixed to said transducer head and positioned substantially perpendicular to said gap line whereby said gap line is substantially radially oriented; and a transformer including a ferrite core coupled to said transducer mounting bracket and a U-shaped rigid conductor, said ferrite core having an aperture therein and said U-shaped conductor passing through said aperture and the two legs of said U-shaped conductor being coupled to said first and second ends, respectively, of said ribbon-like electrical conductor said aperture being of sufficient size to permit movement of said U-shaped rigid conductor relative to said ferrite core without said U-shaped conductor contacting said ferrite core, whereby said transducer head is freely movable radially to compensate for drum eccentricity and run-out.

References Cited in the file of this patent

UNITED STATES PATENTS

| | | |
|---|---|---|
| 2,676,392 | Buhrendorf | Apr. 27, 1954 |
| 2,862,066 | Thiele | Nov. 25, 1958 |
| 2,863,002 | Brower | Dec. 2, 1958 |
| 2,863,004 | Maclay et al. | Dec. 2, 1958 |
| 2,913,536 | Fuller | Nov. 17, 1959 |
| 2,931,691 | Curtis | Apr. 5, 1960 |